(12) United States Patent
Oyobe et al.

(10) Patent No.: US 7,755,306 B2
(45) Date of Patent: Jul. 13, 2010

(54) ELECTRIC POWER CONTROL DEVICE, ELECTRIC POWERED VEHICLE INCLUDING THE SAME, AND METHOD FOR CONTROLLING ELECTRIC POWER OF ELECTRIC VEHICLE

(75) Inventors: Hichirosai Oyobe, Toyota (JP); Shoichi Sasaki, Mishima (JP); Makoto Nakamura, Okazaki (JP); Tetsuhiro Ishikawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 172 days.

(21) Appl. No.: 11/992,166

(22) PCT Filed: Aug. 31, 2006

(86) PCT No.: PCT/JP2006/317709

§ 371 (c)(1),
(2), (4) Date: Mar. 18, 2008

(87) PCT Pub. No.: WO2007/034682

PCT Pub. Date: Mar. 29, 2007

(65) Prior Publication Data
US 2009/0115355 A1 May 7, 2009

(30) Foreign Application Priority Data
Sep. 21, 2005 (JP) .............................. 2005-274304

(51) Int. Cl.
*H02P 1/54* (2006.01)
(52) U.S. Cl. ........................................ 318/98; 318/112
(58) Field of Classification Search ................... 318/49, 318/98, 112, 139, 440, 442; 361/23, 33
See application file for complete search history.

(56) References Cited

U.S. PATENT DOCUMENTS

| 5,099,186 | A  | * | 3/1992 | Rippel et al. ................. 318/803 |
| 6,426,608 | B2 |   | 7/2002 | Amano et al. |
| 6,630,804 | B2 |   | 10/2003 | Moriya et al. |
| 6,806,671 | B2 |   | 10/2004 | Kusaka et al. |
| 6,908,162 | B2 |   | 6/2005 | Obayashi et al. |
| 7,109,681 | B2 | * | 9/2006 | Baker et al. ................. 318/801 |
| 2001/0052760 | A1 |   | 12/2001 | Amano et al. |
| 2002/0105300 | A1 |   | 8/2002 | Moriya et al. |
| 2003/0057908 | A1 |   | 3/2003 | Kusaka et al. |

(Continued)

FOREIGN PATENT DOCUMENTS

EP    1 168 568 A1    1/2002

(Continued)

OTHER PUBLICATIONS

Mar. 30, 2010 Office Action issued in Japanese Patent Application No. 2005-274304.

*Primary Examiner*—Rina I Duda
(74) *Attorney, Agent, or Firm*—Oliff & Berridge, PLC (57) ABSTRACT

A load on a vehicle is connected to first and second neutral points in first and second motor generators through a relay circuit and power output lines. A control device controls inverters depending on a requested voltage of the load on a vehicle such that a potential at the first neutral point becomes higher than a potential at the second neutral point by that requested voltage.

9 Claims, 7 Drawing Sheets

U.S. PATENT DOCUMENTS

2003/0146726 A1* 8/2003 Ishikawa et al. ............ 318/442
2004/0239181 A1    12/2004 Obayashi et al.

FOREIGN PATENT DOCUMENTS

| JP | A-1-248960   | 10/1989 |
| JP | A-07-170611  | 7/1995  |
| JP | A-2001-037247 | 2/2001 |
| JP | A-2002-010408 | 1/2002 |
| JP | A-2002-218793 | 8/2002 |
| JP | A-2003-102181 | 4/2003 |
| JP | A-2003-143897 | 5/2003 |
| JP | A-2004-142662 | 5/2004 |
| JP | A-2004-254465 | 9/2004 |
| JP | A-2005-045879 | 2/2005 |
| JP | A-2005-204361 | 7/2005 |
| WO | WO 2005/069471 A1 | 7/2005 |

* cited by examiner

ELECTRIC POWER CONTROL DEVICE, ELECTRIC POWERED VEHICLE INCLUDING THE SAME, AND METHOD FOR CONTROLLING ELECTRIC POWER OF ELECTRIC VEHICLE

TECHNICAL FIELD

The present invention relates to an electric power control device, and an electric powered vehicle including the same. In particular, the present invention relates to an electric power control device that steps down a voltage from a power storage device for main machinery and supplies a resultant voltage to a vehicle-mounted load, and an electric powered vehicle including the same.

BACKGROUND ART

An electric powered vehicle such as an electric vehicle or a hybrid vehicle requires a high-voltage source for main machinery and a low-voltage source for auxiliaries. Conventionally, a DC/DC converter reduces a direct current (DC) voltage outputted from the high-voltage source for the main machinery to obtain a low voltage for the auxiliary.

Japanese Patent Laying-Open No. 7-170611 discloses an electric power control device for an electric vehicle, including such a DC/DC converter. The electric power control device includes a main battery, and a DC/DC converter that converts a high voltage from the main battery to a low voltage. In the electric power control device, the low voltage outputted from the DC/DC converter allows direct actuation of an electric load on a low voltage side.

This electric power control device has no battery for auxiliaries, and the DC/DC converter converts the high voltage from the main battery to the low voltage. Since the electric load on the low voltage side is directly actuated by the output from the DC/DC converter, the electric power control device is reduced in size and wiring in the electric power control device is performed readily.

The electric power control device disclosed in Japanese Patent Laying-Open No. 7-170611 is effective because the battery for the auxiliaries becomes unnecessary. However, the electric power control device still requires the DC/DC converter for converting the high voltage from the main battery to the low voltage.

Recently, in order to deal with an increase in electric loads to be mounted to a vehicle, a 42V power supply system tends to be used together with a conventional 14V power supply system. In future, it can be expected that various power supply systems will be mounted to one vehicle in accordance with loads to be mounted to the vehicle. However, provision of a DC/DC converter for each power supply system hinders size reduction, weight reduction, cost reduction and the like of a vehicle.

DISCLOSURE OF THE INVENTION

The present invention has been devised to solve the foregoing problems, and an object thereof is to provide an electric power control device capable of supplying electric power to a vehicle-mounted load without use of a DC/DC converter.

Another object of the present invention is to provide an electric powered vehicle including an electric power control device capable of supplying electric power to a vehicle-mounted load without use of a DC/DC converter.

According to the present invention, the electric power control device includes: a first polyphase alternating current (AC) motor that includes a star-connected first polyphase winding as a stator winding; a second polyphase AC motor that includes a star-connected second polyphase winding as a stator winding; a first power storage device that supplies electric power to the first and second polyphase AC motors; a vehicle-mounted load that is electrically connected between a first neutral point of the first polyphase winding and a second neutral point of the second polyphase winding; and voltage control portion that controls a voltage across the first and second neutral points in accordance with a request voltage for the vehicle-mounted load.

In the electric power control device according to the present invention, the vehicle-mounted load is connected between the first neutral point of the first polyphase AC motor and the second neutral point of the second polyphase AC motor. Then, the voltage across the first and second neutral points is controlled in accordance with the request voltage for the vehicle-mounted load. Thus, the vehicle-mounted load receives electric power from the first and second neutral points each having a potential controlled at the request voltage.

Hence, the electric power control device according to the present invention allows supply of electric power to the vehicle-mounted load without additional provision of a dedicated voltage conversion device.

Preferably, the vehicle-mounted load includes a DC load. The voltage control portion generates a DC voltage across the first and second neutral points in accordance with a request voltage for the DC load.

Hence, the electric power control device according to the present invention allows supply of electric power to the vehicle-mounted load without use of a DC/DC converter.

More preferably, the DC load includes a plurality of load groups different in operating voltage from each other. The electric power control device further includes: a plurality of second power storage devices that supply electric power to the plurality of load groups, respectively; and a switch device configured to be capable of electrically connecting one of the plurality of second power storage devices to the first and second neutral points. The voltage control portion outputs, to the switch device, a command for electrically connecting one of the plurality of second power storage devices to the first and second neutral points, on the basis of states-of-charge of the plurality of second power storage devices, and controls the voltage across the first and second neutral points at an operating voltage level of the load group that receives electric power from the second power storage device electrically connected to the first and second neutral points.

In the electric power control device, the plurality of second power storage devices are alternately connected to the first and second neutral points on the basis of the states-of-charge of the plurality of second power storage devices. Thus, the plurality of second power storage devices can be charged through the first and second neutral points. Accordingly, the electric power control device can stably supply electric power to the plurality of load groups without use of a DC/DC converter.

More preferably, the voltage control portion outputs, to the switch device, a command for electrically connecting the second power storage device having the lowest state-of-charge to the first and second neutral points.

In the electric power control device, the second power storage device having the lowest state-of-charge is electrically connected to the first and second neutral points, and is charged by reception of electric power from the first and second neutral points. Accordingly, the electric power control device can prevent the second power storage device from being discharged excessively.

According to the present invention, an electric powered vehicle includes: the electric power control device described above; and a driving wheel that is mechanically linked to a rotation shaft of at least one of the first and second polyphase AC motors.

The electric powered vehicle according to the present invention includes the electric power control device described above and, therefore, requires no DC/DC converter. Hence, the electric powered vehicle according to the present invention can achieve size reduction, weight reduction, cost reduction and the like thereof.

As described above, according to the present invention, the vehicle-mounted load is electrically connected between the first neutral point of the first polyphase AC motor and the second neutral point of the second polyphase AC motor, and the voltage across the first and second neutral points is controlled in accordance with the request voltage for the vehicle-mounted load. Therefore, it is possible to supply electric power to the vehicle-mounted load without additional provision of a dedicated voltage conversion device such as a DC/DC converter.

BEST MODES FOR CARRYING OUT THE INVENTION

With reference to the drawings, hereinafter, detailed description will be given of embodiments of the present invention. In the drawings, identical or corresponding portions are denoted by identical reference characters; therefore, description thereof will not be given repeatedly.

Embodiment 1

Figure 1:
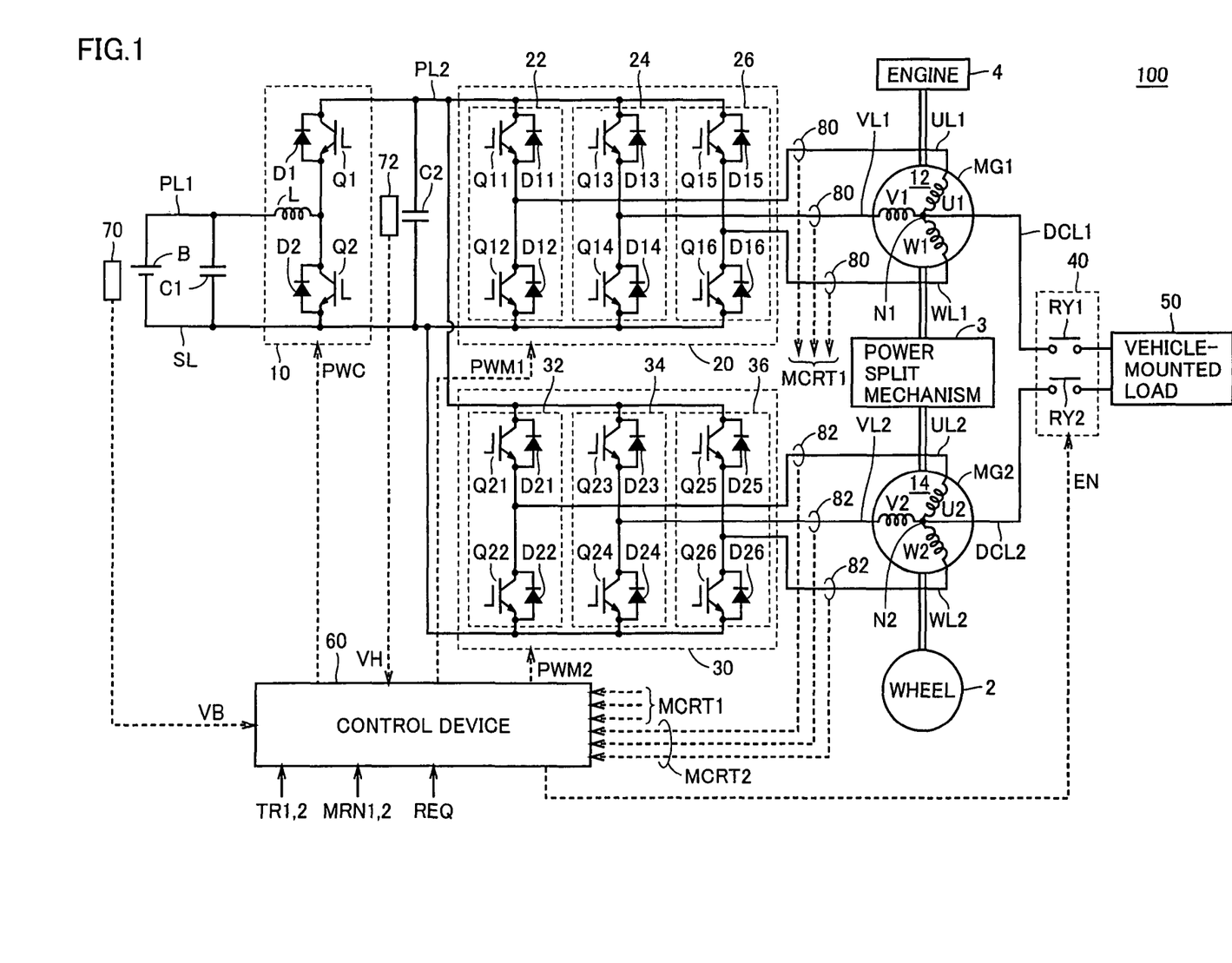
FIG. 1 is a general block diagram of a hybrid vehicle shown as one example of an electric powered vehicle according to Embodiment 1 of the present invention.

FIG. 1 is a general block diagram of a hybrid vehicle 100 shown as one example of an electric powered vehicle according to Embodiment 1 of the present invention. With reference to FIG. 1, hybrid vehicle 100 includes an engine 4, motor generators MG1 and MG2, a power split mechanism 3, and wheels 2. Hybrid vehicle 100 also includes a power storage device B, a boost converter 10, inverters 20 and 30, a control device 60, capacitors C1 and C2, power supply lines PL1 and PL2, a grounding line SL, U-phase lines UL1 and UL2, V-phase lines VL1 and VL2, W-phase lines WL1 and WL2, voltage sensors 70 and 72, and current sensors 80 and 82. Hybrid vehicle 100 also includes power output lines DCL1 and DCL2, a relay circuit 40, and a vehicle-mounted load 50.

Hybrid vehicle 100 runs with engine 4 and motor generator MG2 being used as a motive power source. Power split mechanism 3 distributes motive power to engine 4, motor generator MG1 and motor generator MG2 each linked thereto. For example, power split mechanism 3 may be a planetary gear mechanism having three rotation shafts: a sun gear, a planetary carrier and a ring gear. The three rotation shafts are connected to a rotation shaft of engine 4, a rotation shaft of motor generator MG1 and a rotation shaft of motor generator MG2, respectively. For example, motor generator MG1 includes a hollow rotor, and a crank shaft of engine 4 is inserted into a center of the hollow rotor. Thus, engine 4, motor generator MG1 and motor generator MG2 can be mechanically connected to power split mechanism 3.

Herein, the rotation shaft of motor generator MG2 is linked to wheel 2 through a reduction gear or a differential gear (not shown). Further, a speed reducer to the rotation shaft of motor generator MG2 may be incorporated into power split mechanism 3.

Herein, motor generator MG1 is incorporated into hybrid vehicle 100 so as to act as a generator driven by engine 4 and also act as a motor capable of starting up engine 4. Motor generator MG2 is incorporated into hybrid vehicle 100 so as to act as a motor used for driving wheel 2.

Power storage device B has a positive electrode connected to power supply line PL1, and a negative electrode connected to grounding line SL. Capacitor C1 is connected between power supply line PL1 and grounding line SL.

Boost converter 10 includes a reactor L, npn-type transistors Q1 and Q2, and diodes D1 and D2. Herein, npn-type transistors Q1 and Q2 are connected in series between power supply line PL2 and grounding line SL. Diode D1 is connected between a collector and an emitter of npn-type transistor Q1 and diode D2 is connected between a collector and an emitter of npn-type transistor Q2 such that a current flows from each emitter toward each collector. Reactor L has a first end connected to a node between npn-type transistors Q1 and Q2 and a second end connected to power supply line PL1.

For example, an IGBT (Insulated Gate Bipolar Transistor) may be used as the npn-type transistor described above and an npn-type transistor to be described below in this specification. Moreover, a power switching element such as a power MOSFET (Metal Oxide Semiconductor Field-Effect Transistor) may be used instead of the npn-type transistor.

Capacitor C2 is connected between power supply line PL2 and grounding line SL. Inverter 20 includes a U-phase arm 22, a V-phase arm 24 and a W-phase arm 26. U-phase arm 22, V-phase arm 24 and W-phase arm 26 are connected in parallel between power supply line PL2 and grounding line SL. U-phase arm 22 includes npn-type transistors Q11 and Q12 connected in series, V-phase arm 24 includes npn-type transistors Q13 and Q14 connected in series, and W-phase arm 26 includes npn-type transistors Q15 and Q16 connected in series. A diode D11 is connected between a collector and an emitter of npn-type transistor Q11, a diode D12 is connected between a collector and an emitter of npn-type transistor Q12, a diode D13 is connected between a collector and an emitter of npn-type transistor Q13, a diode D14 is connected between a collector and an emitter of npn-type transistor Q14, a diode D15 is connected between a collector and an emitter of npn-type transistor Q15 and a diode D16 is connected between a collector and an emitter of npn-type transistor Q16 such that a current flows from each emitter toward each collector.

Motor generator MG1 includes a three-phase coil 12 as a stator coil. Three-phase coil 12 consists of a U-phase coil U1, a V-phase coil V1 and a W-phase coil W1. U-phase coil U1, V-phase coil V1 and W-phase coil W1 have first ends connected to one another to form a neutral point N1, and second ends connected to a node between upper and lower arms of U-phase arm 22, a node between upper and lower arms of V-phase arm 24 and a node between upper and lower arms of W-phase arm 26 in inverter 20, respectively.

Inverter 30 includes a U-phase arm 32, a V-phase arm 34 and a W-phase arm 36. Motor generator MG2 includes a three-phase coil 14 as a stator coil. Inverter 30 and motor generator MG2 are similar in configurations to inverter 20 and motor generator MG1, respectively.

Relay circuit 40 includes relays RY1 and RY2. Power output lines DCL1 has a first end connected to a first end of relay RY1, and a second end connected to neutral point N1. On the other hand, power output line DCL2 has a first end connected to a first end of relay RY2, and a second end connected to a neutral point N2. Further, vehicle-mounted load 50 is connected to second ends of relays RY1 and RY2.

Power storage device B is a chargeable/dischargeable DC power supply, and configured with a secondary battery such as a nickel-metal hydride battery, a lithium ion battery or the like for example. Power storage device B outputs DC power to boost converter 10. Moreover, power storage device B is charged by boost converter 10. Herein, power storage device B may be a capacitor having a large capacity.

Voltage sensor 70 detects a voltage VB at power storage device B, and outputs detected voltage VB to control device 60. Capacitor C1 smoothes a voltage fluctuation between power supply line PL1 and grounding line SL.

On the basis of a signal PWC from control device 60, boost converter 10 boosts a DC voltage received from power storage device B, with the use of reactor L, and supplies a resultant voltage to power supply line PL2. More specifically, on the basis of signal PWC from control device 60, boost converter 10 stores, as magnetic field energy, a current flowing in accordance with a switching operation of npn-type transistor Q2, in reactor L, thereby boosting a DC voltage received from power storage device B. Then, boost converter 10 outputs a resultant voltage to power supply line PL2 through diode D1 in synchronization with a timing that npn-type transistor Q2 is turned off. On the basis of signal PWC from control device 60, moreover, boost converter 10 reduces a DC voltage supplied from power supply line PL2 to charge power storage device B.

Capacitor C2 smoothes a voltage fluctuation between power supply line PL2 and grounding line SL. Voltage sensor 72 detects a voltage across terminals of capacitor C2, that is, a voltage VH at power supply line PL2 with respect to grounding line SL, and outputs detected voltage VH to control device 60.

On the basis of a signal PWM1 from control device 60, inverter 20 converts a DC voltage received from power supply line PL2, to a three-phase AC voltage, and outputs the converted three-phase AC voltage to motor generator MG1. Moreover, inverter 20 converts a three-phase AC voltage, which is generated by motor generator MG1 by reception of output power from engine 4, to a DC voltage on the basis of signal PWM1 from control device 60, and outputs the converted DC voltage to power supply line PL2.

On the basis of a signal PWM2 from control device 60, inverter 30 converts a DC voltage received from power supply line PL2, to a three-phase AC voltage, and outputs the converted three-phase AC voltage to motor generator MG2. At the time of regenerative braking of the vehicle, moreover, inverter 30 converts a three-phase AC voltage, which is generated by motor generator MG2 by reception of a rotating force from wheel 2, to a DC voltage on the basis of signal PWM2 from control device 60, and outputs the converted DC voltage to power supply line PL2.

Herein, inverter 20 and 30 generate a voltage across neutral points N1 and N2 on the basis of signal PWM1 and PWM2 from control device 60, respectively. In order to supply a request voltage from neutral points N1 and N2 to vehicle-mounted load 50 through power output lines DCL1 and DCL2, inverter 20 sets a potential of neutral point N1 at a potential which is higher than a potential of neutral point N2 set by inverter 30, by the request voltage for vehicle-mounted load 50.

Each of motor generators MG1 and MG2 is a three-phase AC motor, for example, an IPM (Interior Permanent Magnet) type three-phase AC synchronous motor. Motor generator MG1 is linked to engine 4, generates a three-phase AC voltage from output power from engine 4, and outputs the generated three-phase AC voltage to inverter 20. Moreover, motor generator MG1 receives the three-phase AC voltage from inverter 20 to generate a driving force, and starts up engine 4. Motor generator MG2 is linked to wheel 2, and generates torque for driving the vehicle from a three-phase AC voltage received from inverter 30. At the time of regenerative braking of the vehicle, further, motor generator MG2 generates a braking force for the vehicle and, also, generates a three-phase AC voltage. Then, motor generator MG2 outputs the three-phase AC voltage to inverter 30.

In relay circuit 40, relay RY1 connects/disconnects between power output line DCL1 and vehicle-mounted load 50 while relay RY2 connects/disconnects between power output line DCL2 and vehicle-mounted load 50. Relay circuit 40 receives an output permission command EN from control device 60 to turn on relay RY1 or RY2. Thus, vehicle-mounted load 50 is electrically connected to power output line DCL1 or DCL2.

Vehicle-mounted load 50 is a DC load, and receives DC power from power output lines DCL1 and DCL2 connected to neutral points N1 and N2, respectively. Examples of vehicle-mounted load 50 include an engine heater for a cold region, a catalyst heater for warming a catalyst used for purifying exhaust gas, a heater for warming an interior of the vehicle, and the like.

Current sensor 80 detects a motor current MCRT1 flowing through motor generator MG1, and outputs detected motor current MCRT1 to control device 60. Current sensor 82 detects a motor current MCRT2 flowing through motor generator MG2, and outputs detected motor current MCRT2 to control device 60.

On the basis of torque command values TR1 and TR2 as well as motor rotation speeds MRN1 and MRN2 of motor generators MG1 and MG2, each outputted from an ECU (Electronic Control Unit) (not shown), voltage VB outputted from voltage sensor 70, and voltage VH outputted from voltage sensor 72, control device 60 generates a signal PWC used for driving boost converter 10, and outputs generated signal PWC to boost converter 10.

On the basis of voltage VH, torque command value TR1 of motor generator MG1, and motor current MCRT1 from current sensor 80, moreover, control device 60 generates a signal PWM1 for driving motor generator MG1, and outputs generated signal PWM1 to inverter 20. On the basis of voltage VH, torque command value TR2 of motor generator MG2, and motor current MCRT2 from current sensor 82, further, control device 60 generates a signal PWM2 for driving motor generator MG2, and outputs generated signal PWM2 to inverter 30.

Moreover, control device 60 receives, from the ECU, a request command REQ for issuing a request to supply electric power to vehicle-mounted load 50 to calculate a request voltage for vehicle-mounted load 50. In a case where vehicle-mounted load 50 is, for example, an engine heater for a cold region, control device 60 calculates the request voltage on the basis of a temperature of engine cooling water. In a case where vehicle-mounted load 50 is, for example, a catalyst heater, control device 60 calculates the request voltage on the basis of a temperature of a catalyst. In a case where vehicle-mounted load 50 is, for example, a heater for warming an interior of the vehicle, control device 60 calculates the request voltage on the basis of a set temperature in the interior.

Then, control device 60 generates a voltage command value for generating the calculated request voltage across neutral points N1 and N2, and generates signals PWM1 and PWM2 for inverters 20 and 30 with the use of the voltage command value. Moreover, control device 60 receives request command REQ to output, to relay circuit 40, output permission command EN.

Figure 2:
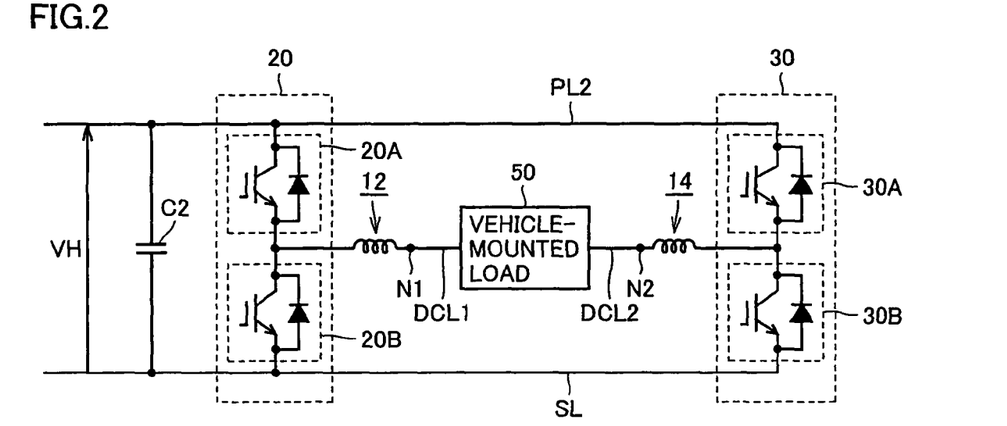
FIG. 2 is a circuit diagram showing a zero-phase equivalent circuit including inverters and motor generators shown in FIG. 1.

FIG. 2 is a circuit diagram showing a zero-phase equivalent circuit including inverter 20, inverter 30, motor generator MG1 and motor generator MG2 shown in FIG. 1. With reference to FIG. 2, there are eight combinations of an on state with an off state of the six npn-type transistors in each of three-phase inverters 20 and 30. In two of the eight switching patterns, an interphase voltage becomes zero, and such a voltage state is referred to as a zero voltage vector. With respect to the zero voltage vector, it can be regarded that the three transistors of the upper arms are in the same switching state (that is, all transistors are switched on or off). In addition, it can be regarded that the three transistors of the lower arms are also in the same switching state. In FIG. 2, therefore, npn-type transistors Q11, Q13 and Q15 of inverter 20 are collectively shown as an upper arm 20A, and npn-type transistors Q12, Q14 and Q16 of inverter 20 are collectively shown as a lower arm 20B. Also in FIG. 2, npn-type transistors Q21, Q23 and Q25 of inverter 30 are collectively shown as an upper arm 30A, and npn-type transistors Q22, Q24 and Q26 of inverter 30 are collectively shown as a lower arm 30B.

In each of inverters 20 and 30, use of this zero voltage vector allows control of a potential at a relevant neutral point without changing a d-axial current and a q-axial current of a relevant motor generator, that is, without exerting an adverse influence on torque control of the motor generator.

Hence, it is possible to generate a voltage across neutral points N1 and N2 in accordance with the request voltage for vehicle-mounted load 50 with the use of the zero voltage vector of each of inverters 20 and 30, and supply electric power from neutral points N1 and N2 to vehicle-mounted load 50 through power output lines DCL1 and DCL2. Thus, it is possible to generate a voltage requested by vehicle-mounted load 50 and give the voltage to vehicle-mounted load 50 without using a DC/DC converter and without exerting an adverse influence on torque control for motor generators MG1 and MG2.

Figure 3:
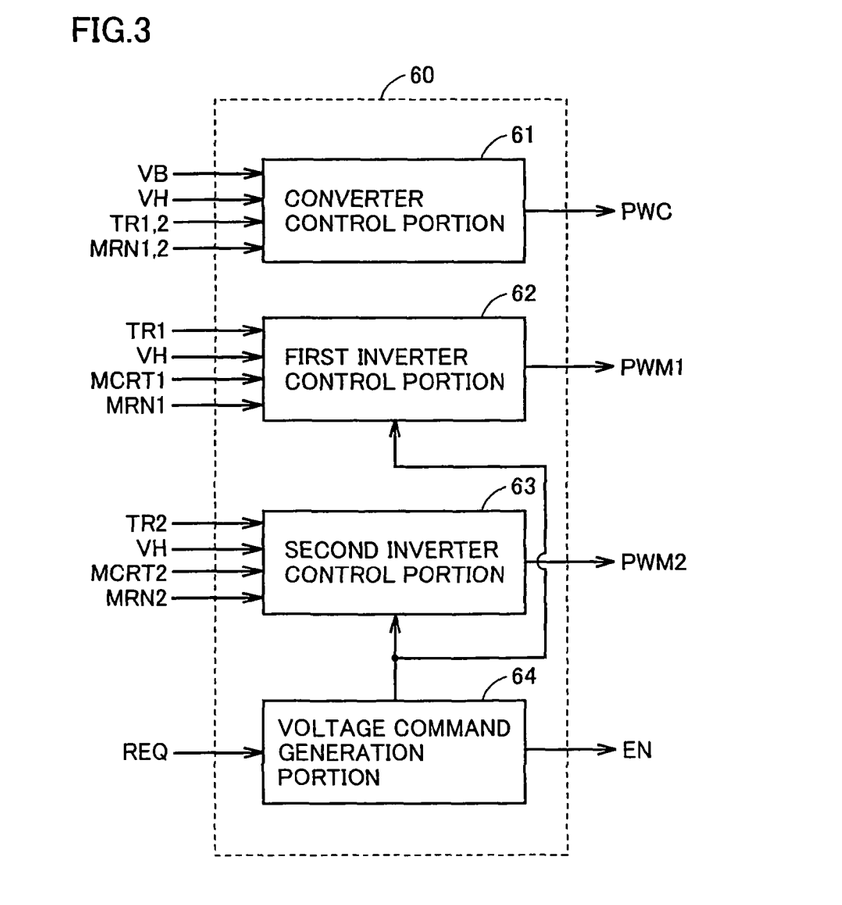
FIG. 3 is a functional block diagram of a control device shown in FIG. 1.

FIG. 3 is a functional block diagram of control device 60 shown in FIG. 1. With reference to FIG. 3, control device 60 includes a converter control portion 61, a first inverter control portion 62, a second inverter control portion 63 and a voltage command generation portion 64. On the basis of voltage VB outputted from voltage sensor 70, voltage VH outputted from voltage sensor 72, torque command values TR1 and TR2, and motor rotation speeds MRN1 and MRN2, converter control portion 61 generates a signal PWC for turning on/off npn-type transistors Q1 and Q2 of boost converter 10, and outputs generated signal PWC to boost converter 10.

On the basis of torque command value TR1, motor current MCRT1 and motor rotation speed MRN1 of motor generator MG1, and voltage VH, first inverter control portion 62 generates a signal PWM1 for turning on/off npn-type transistors Q11 to Q16 of inverter 20, and outputs generated signal PWM1 to inverter 20.

On the basis of torque command value TR2, motor current MCRT2 and motor rotation speed MRN2 of motor generator MG2, and voltage VH, second inverter control portion 63 generates a signal PWM2 for turning on/off npn-type transistors Q21 to Q26 of inverter 30, and outputs generated signal PWM2 to inverter 30.

Herein, each of first inverter control portion 62 and second inverter control portion 63 receives a voltage command value from voltage command generation portion 64 in order to generate, across neutral points N1 and N2, a request voltage for vehicle-mounted load 50. On the basis of the voltage command value, then, first inverter control portion 62 generates signal PWM1 while controlling the zero voltage vector of inverter 20, and second inverter control portion 63 generates signal PWM2 while controlling the zero voltage vector of inverter 30.

Voltage command generation portion 64 receives request command REQ for issuing a request to supply electric power to vehicle-mounted load 50 to calculate the request voltage for vehicle-mounted load 50. Then, voltage command generation portion 64 generates a voltage command value for generating, across neutral points N1 and N2, the calculated request voltage, and outputs the generated voltage command value to each of first inverter control portion 62 and second inverter control portion 63. Moreover, voltage command generation portion 64 receives request command REQ to output, to relay circuit 40, output permission command EN.

Figure 4:
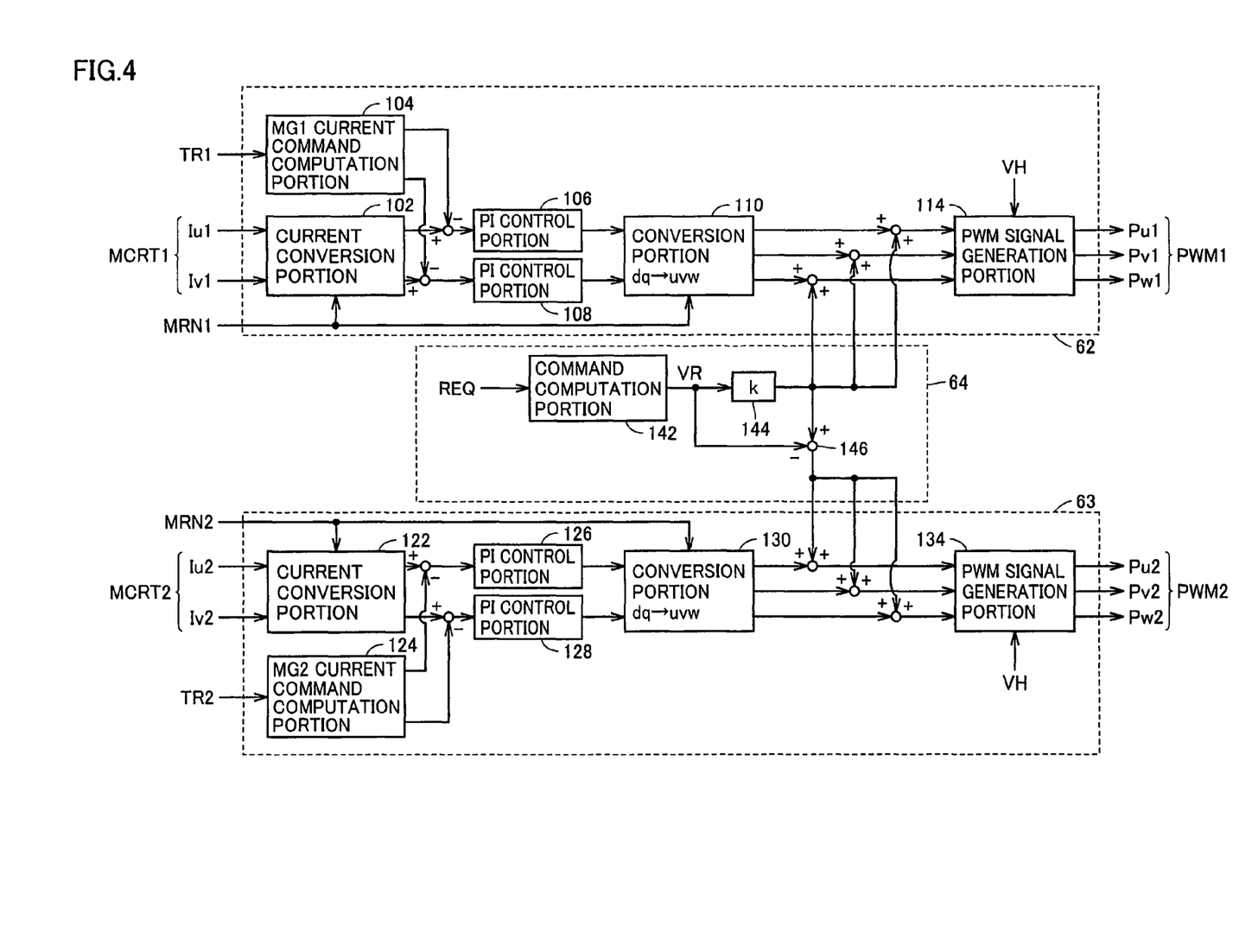
FIG. 4 is a detailed functional block diagram of a first inverter control portion, a second inverter control portion and a voltage command generation portion each shown in FIG. 3.

FIG. 4 is a detailed functional block diagram of first inverter control portion 62, second inverter control portion 63 and voltage command generation portion 64 each shown in FIG. 3. With reference to FIG. 4, first inverter control portion 62 includes a current conversion portion 102, an MG1 current command computation portion 104, PI control portions 106 and 108, a conversion portion 110, and a PWM signal generation portion 114.

With the use of motor rotation speed MRN1 of motor generator MG1, current conversion portion 102 converts a U-phase current Iu1 and a V-phase current Iv1, each detected by current sensor 80, to a d-axial current Id1 and a q-axial current Iq1. On the basis of torque command value TR1 of motor generator MG1, MG1 current command computation portion 104 calculates current commands Id1$r$ and Iq1$r$ of motor generator MG1 on d- and q-axes.

PI control portion 106 receives a deviation between d-axial current Id1 from current conversion portion 102 and current command Id1$r$ from MG1 current command computation portion 104, performs a proportional integral computation with the deviation being used as an input, and outputs a result of the computation to conversion portion 110. PI control portion 108 receives a deviation between q-axial current Iq1 from current conversion portion 102 and current command Iq1$r$ from MG1 current command computation portion 104, performs a proportional integral computation with the deviation being used as an input, and outputs a result of the computation to conversion portion 110.

Conversion portion 110 receives voltage commands on the d- and q-axes from PI control portions 106 and 108, and converts these voltage commands to U-, V- and W-phase voltage commands of motor generator MG1 with the use of motor rotation speed MRN1.

On the basis of voltage commands obtained from superimposition of the voltage command values from voltage command generation portion 64 on the U-, V- and W-phase voltage commands from conversion portion 110, and voltage VH outputted from voltage sensor 72, PWM signal generation portion 114 generates PWM signals Pu1, Pv1 and Pw1 corresponding to inverter 20, and outputs, as a signal PWM1, generated PWM signals Pu1, Pv1 and Pw1 to inverter 20.

Herein, the uniform superimposition of the voltage command values from voltage command generation portion 64 on the U-, V- and W-phase voltage commands of motor generator MG1 from conversion portion 110 corresponds to the change of the zero voltage vector of inverter 20 based on the voltage command value from voltage command generation portion 64.

Second inverter control portion 63 includes a current conversion portion 122, an MG2 current command computation portion 124, PI control portions 126 and 128, a conversion portion 130, and a PWM signal generation portion 134. With the use of motor rotation speed MRN2 of motor generator MG2, current conversion portion 122 converts a U-phase current Iu2 and a V-phase current Iv2, each detected by current sensor 82, to a d-axial current Id2 and a q-axial current Iq2. On the basis of torque command value TR2 of motor generator MG2, MG2 current command computation portion 124 calculates current commands Id2r and Iq2r of motor generator MG2 on the d- and q-axes.

PI control portion 126 receives a deviation between d-axial current Id2 from current conversion portion 122 and current command Id2r from MG2 current command computation portion 124, performs a proportional integral computation with the deviation being used as an input, and outputs a result of the computation to conversion portion 130. PI control portion 128 receives a deviation between q-axial current Iq2 from current conversion portion 122 and current command Iq2r from MG2 current command computation portion 124, performs a proportional integral computation with the deviation being used as an input, and outputs a result of the computation to conversion portion 130.

Conversion portion 130 receives voltage commands on the d- and q-axes from PI control portions 126 and 128, and converts these voltage commands to U-, V- and W-phase voltage commands of motor generator MG2 with the use of motor rotation speed MRN2.

On the basis of voltage commands obtained from superimposition of the voltage command values from voltage command generation portion 64 on the U-, V- and W-phase voltage commands of motor generator MG2 from conversion portion 130, and voltage VH, PWM signal generation portion 134 generates PWM signals Pu2, Pv2 and Pw2 corresponding to inverter 30, and outputs, as a signal PWM2, generated PWM signals Pu2, Pv2 and Pw2 to inverter 30.

Herein, the uniform superimposition of the voltage command values from voltage command generation portion 64 on the U-, V- and W-phase voltage commands of motor generator MG2 from conversion portion 130 corresponds to the change of the zero voltage vector of inverter 30 based on the voltage command value from voltage command generation portion 64.

Voltage command generation portion 64 includes a command computation portion 142, a multiplication portion 144 and a subtraction portion 146. Command computation portion 142 receives request command REQ to calculate a request voltage for vehicle-mounted load 50. Then, command computation portion 142 outputs the calculated voltage as a voltage command value VR. Multiplication portion 144 multiplies voltage command value VR from command computation portion 142 by k (k: a constant in a range from not less than 0 to not more than 1), and outputs a result of the computation to first inverter control portion 62. Subtraction portion 146 subtracts voltage command value VR from the value outputted from multiplication portion 144, and outputs a result of the computation to second inverter control portion 63.

That is, voltage command value VR outputted from command computation portion 142 is multiplied by k, and then is outputted to first inverter control portion 62. Alternatively, voltage command value VR is multiplied by—(1-k), and then is outputted to second inverter control portion 63. Herein, "k" is a voltage burden ratio of each of inverters 20 and 30 at the time when a voltage corresponding to voltage command value VR is generated across neutral points N1 and N2. If "k" is larger than 0.5, the voltage burden of inverter 20 can be made larger than that of inverter 30. If "k" is smaller than 0.5, the voltage burden of inverter 30 can be made larger than that of inverter 20.

Upon reception of no request command REQ, voltage command generation portion 64 sets voltage command value VR at zero. Accordingly, the voltage command value outputted from voltage command generation portion 64 to each of first inverter control portion 62 and second inverter control portion 63 becomes zero.

Figure 5:
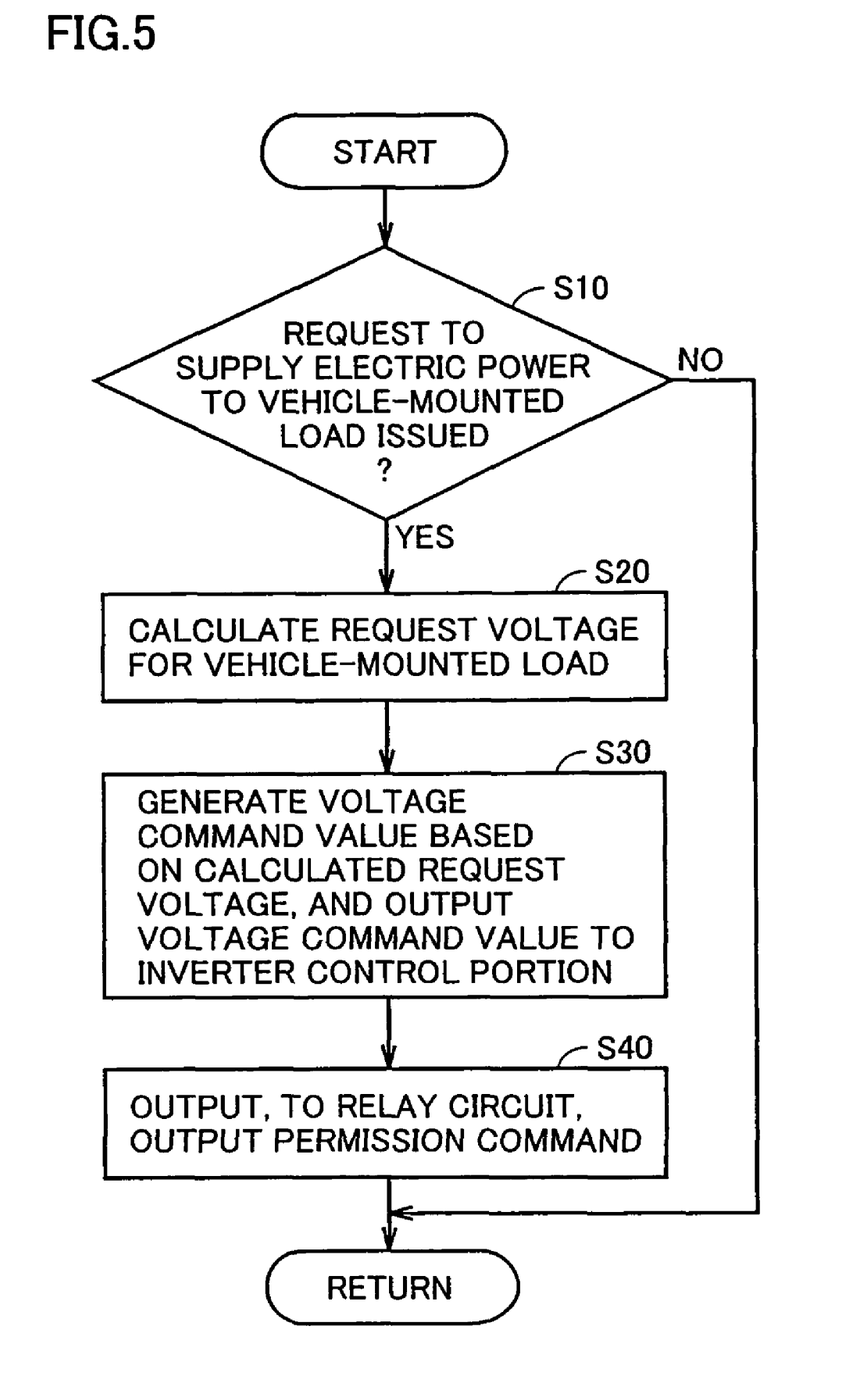
FIG. 5 is a flowchart showing a control structure of processing executed by the voltage command generation portion shown in FIGS. 3 and 4.

FIG. 5 is a flowchart showing a control structure of processing executed by voltage command generation portion 64 shown in FIGS. 3 and 4. The processing in this flowchart is executed while being called from a main routine of control device 60 every certain time interval or each time a predetermined condition is established.

With reference to FIG. 5, voltage command generation portion 64 determines whether a request to supply electric power from neutral points N1 and N2 to vehicle-mounted load 50 is issued, on the basis of request command REQ (step S10). If no request to supply electric power to vehicle-mounted load 50 is issued (NO in step S11), voltage command generation portion 64 completes a sequence of the processing. Then, the processing is returned to the main routine.

On the other hand, if the request to supply electric power to vehicle-mounted load 50 is issued (YES in step S10), voltage command generation portion 40 calculates a request voltage for vehicle-mounted load 50 (step S20). Specifically, for example, if vehicle-mounted load 50 is an engine heater for a cold region, voltage command generation portion 64 calculates the request voltage on the basis of a temperature of engine cooling water. On the other hand, if vehicle-mounted load 50 is a catalyst heater, voltage command generation portion 64 calculates the request command on the basis of a temperature of a catalyst. Moreover, if vehicle-mounted load 50 is a heater for warming an interior of a vehicle, voltage command generation portion 64 calculates the request voltage on the basis of a set temperature of the interior.

After calculation of the request voltage for vehicle-mounted load 50 in step S20, voltage command generation portion 64 generates a voltage command value for generating the request voltage across the first neutral point and the second neutral point, and then outputs the generated voltage command value to each of first inverter control portion 62 and second inverter control portion 63 (step S30). Next, voltage command generation portion 64 outputs an output permission command EN to relay circuit 40 (step S40). Thus, the sequence of the processing is completed.

As described above, according to Embodiment 1, vehicle-mounted load 50 is connected between neutral point N1 of motor generator MG1 and neutral point N2 of motor generator MG2, and the voltage across neutral points N1 and N2 is controlled in accordance with the request voltage for vehicle-mounted load 50. Therefore, the request voltage can be supplied to vehicle-mounted load 50 without use of a DC/DC converter.

Embodiment 2

Figure 6:
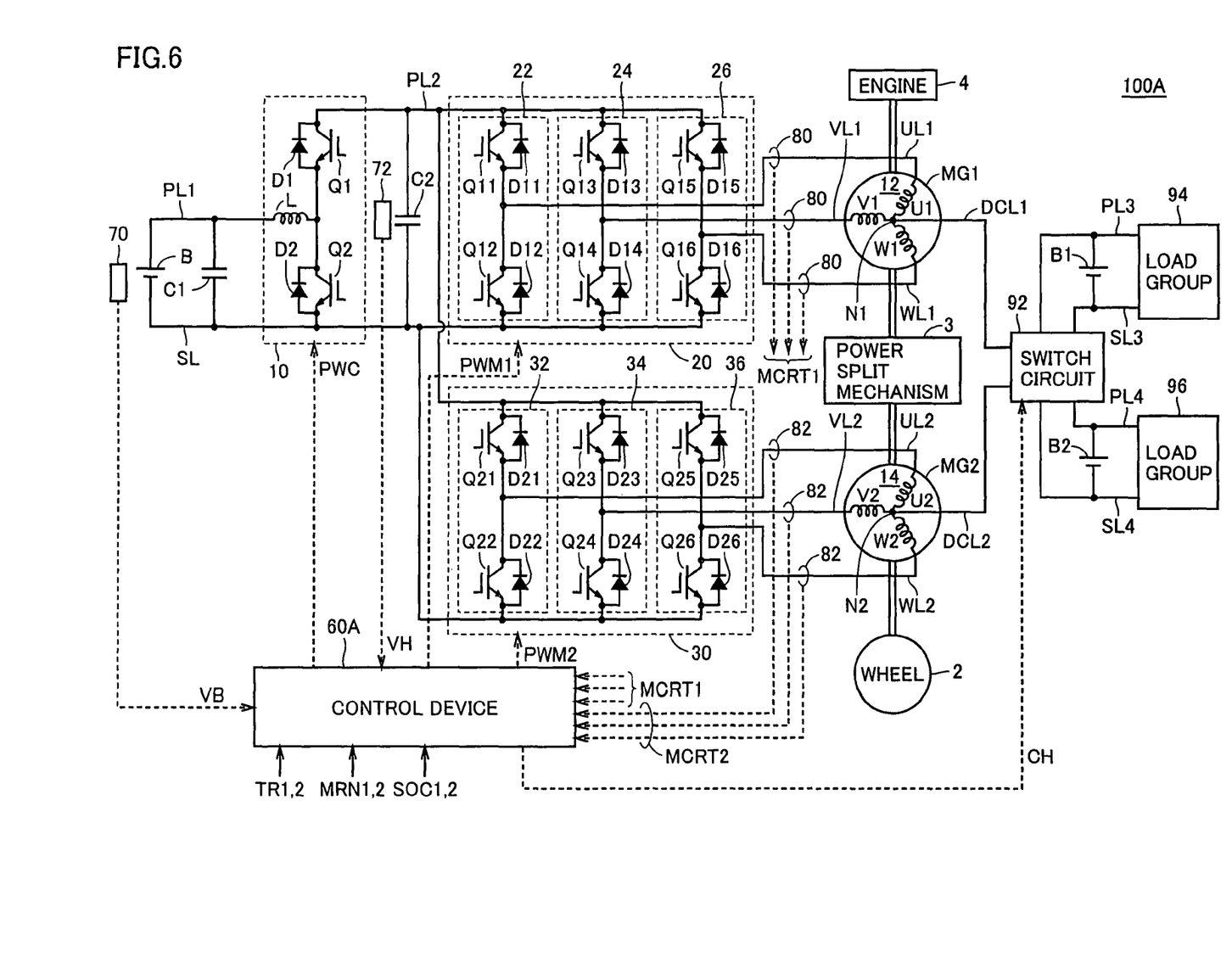
FIG. 6 is a general block diagram of a hybrid vehicle shown as one example of an electric powered vehicle according to Embodiment 2 of the present invention.

FIG. 6 is a general block diagram of a hybrid vehicle 100A shown as one example of an electric powered vehicle according to Embodiment 2 of the present invention. With reference to FIG. 2, hybrid vehicle 100A is different in configuration from hybrid vehicle 100 according to Embodiment 1 shown in FIG. 1. Specifically, hybrid vehicle 100A includes a switch circuit 92, auxiliary batteries B1 and B2, load groups 94 and 96, power supply lines PL3 and PL4, and grounding lines SL3 and SL4, in place of relay circuit 40 and vehicle-mounted load 50. Hybrid vehicle 100A also includes a control device 60A in place of control device 60.

Switch circuit 50 has a pair of input terminals connected to power output lines DCL1 and DCL2, respectively, a first pair of output terminals connected to power supply line PL3 and grounding line SL3, respectively, and a second pair of output terminals connected to power supply line PL4 and grounding line SL4, respectively.

Auxiliary battery B1 has a positive electrode connected to power supply line PL3, and a negative electrode connected to grounding line SL3. Moreover, auxiliary battery B2 has a positive electrode connected to power supply line PL4, and a negative electrode connected to grounding line SL4. Power supply line PL3 and grounding line SL3 are connected to load group 94. On the other hand, power supply line PL4 and grounding line SL4 are connected to load group 96.

Switch circuit 50 receives a switch signal CH at H level from control device 60A to electrically connect power supply line PL3 and grounding line SL3, which are connected to the first pair of output terminals, to power output line DCL1 and power output line DCL2, respectively. On the other hand, switch circuit 50 receives a switch signal CH at L level from control device 60A to electrically connect power supply line PL4 and grounding line SL4, which are connected to the second pair of output terminals, to power output line DCL1 and power output line DCL2, respectively.

Each of auxiliary batteries B1 and B2 is a chargeable/dischargeable DC power supply such as a lead-acid battery. When switch circuit 92 electrically connects power supply line PL3 and grounding line SL3 to power output line DCL1 and power output line DCL2, respectively, auxiliary battery B1 is charged at a first voltage level (e.g., 36 V) by a DC voltage outputted from neutral points N1 and N2. Then, auxiliary battery B1 supplies the DC voltage at the first voltage level to load group 94 through power supply line PL3 and grounding line SL3.

When switch circuit 92 electrically connects power supply line PL4 and grounding line SL4 to power output line DCL1 and power output line DCL2, respectively, auxiliary battery B2 is charged at a second voltage level (e.g., 12 V) by a DC voltage outputted from neutral points N1 and N2. Then, auxiliary battery B2 supplies the DC voltage at the second voltage level to load group 96 through power supply line PL4 and grounding line SL4.

Herein, each of the first voltage level of auxiliary battery B1 and the second voltage level of auxiliary battery B2 is not more than the voltage level of power storage device B. Moreover, a capacity of each of auxiliary batteries B1 and B2 is not more than the capacity of power storage device B. Examples of auxiliary batteries B1 and B2 may include a secondary battery made of nickel-metal hydride, lithium ion or the like, and a capacitor.

Load group 94 mainly includes power-related auxiliaries such as an electric power steering and an electric air conditioner, and operates by reception of an operating voltage at the first voltage level from power supply line PL3. Load group 96 mainly includes body-related auxiliaries such as a lighting system and an audio system, and operates by reception of an operating voltage at the second voltage level from power supply line PL4.

Control device 60A receives, from an ECU (not shown), a value SOC1 indicating a state-of-charge (SOC) of auxiliary battery B1 and a value SOC2 indicating a SOC of auxiliary battery B2. Then, control device 60A generates a switch signal CH on the basis of the received values SOC1 and SOC2, and outputs generated switch signal CH to switch circuit 92.

Further, control device 60A generates a voltage command for generating, across neutral points N1 and N2, a voltage corresponding to the power supply line and the grounding line electrically connected to power output lines DCL1 and DCL2, and generates signals PWM1 and PWM2 for inverters 20 and 30 with the use of the generated voltage command.

Figure 7:
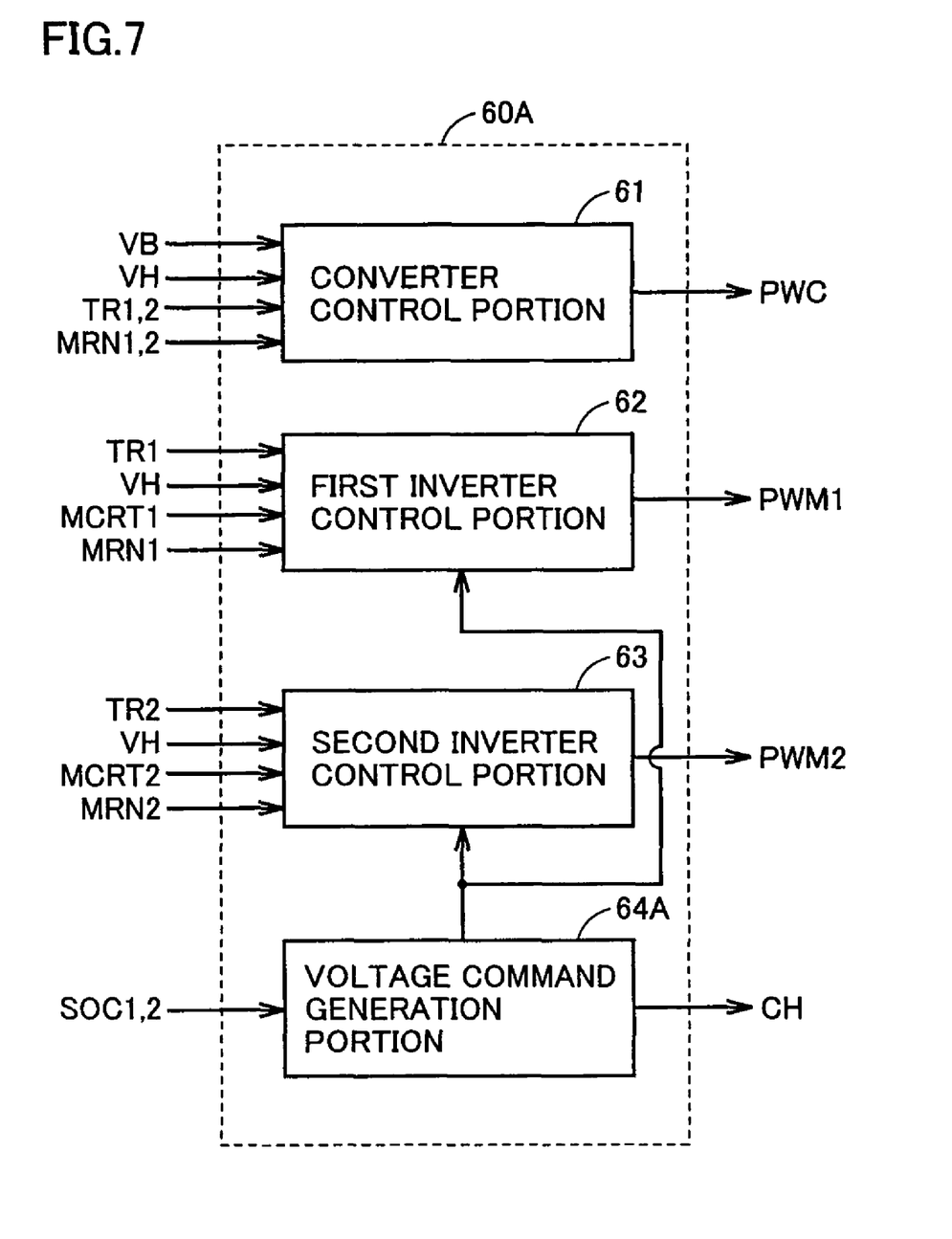
FIG. 7 is a functional block diagram of a control device shown in FIG. 6.

FIG. 7 is a functional block diagram of control device 60A shown in FIG. 6. With reference to FIG. 7, control device 60A is different in configuration from control device 60 in Embodiment 1 shown in FIG. 3. That is, control device 60A includes a voltage command generation portion 64A in place of voltage command generation portion 64.

Voltage command generation portion 64A receives, from the ECU, value SOC1 indicating the SOC of auxiliary battery B1 and value SOC2 indicating the SOC of auxiliary battery B2. When value SOC1 is smaller than value SOC2, voltage command generation portion 64A generates a switch signal CH at H level, and then outputs switch signal CH to switch circuit 92. Further, voltage command generation portion 64A generates a voltage command value for generating, across neutral points N1 and N2, a voltage (at the first voltage level) corresponding to load group 94, and then outputs the voltage command value to first inverter control portion 62 and second inverter control portion 63.

On the other hand, when value SOC2 is smaller than value SOC1, voltage command generation portion 64A generates a switch signal CH at L level, and then outputs switch signal CH to switch circuit 92. Further, voltage command generation portion 64A generates a voltage command value for generating, across neutral points N1 and N2, a voltage (at the second voltage level) corresponding to load group 96, and then outputs the voltage command value to first inverter control portion 62 and second inverter control portion 63.

Figure 8:
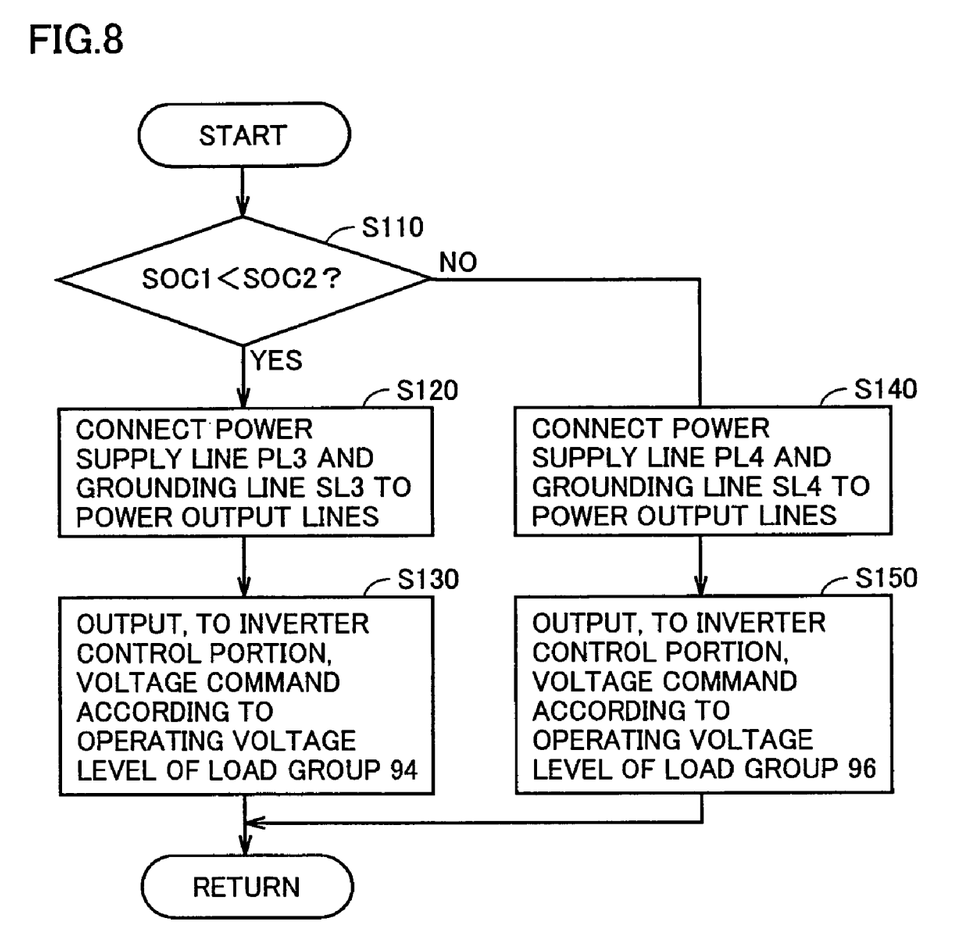
FIG. 8 is a flowchart showing a control structure of processing executed by a voltage command generation portion shown in FIG. 7.

FIG. 8 is a flowchart showing a control structure of processing executed by voltage command generation portion 64A shown in FIG. 7. The processing in this flowchart is executed while being called from a main routine of control device 60A every certain time interval or each time a predetermined condition is established.

With reference to FIG. 8, voltage command generation portion 64A receives, from the ECU, value SOC1 indicating the SOC of auxiliary battery B1 and value SOC2 indicating the SOC of auxiliary battery B2, and then determines whether value SOC1 is smaller than value SOC2 (step S110).

If value SOC1 is smaller than value SOC2 (YES in step S110), voltage command generation portion 64A outputs switch signal CH at H level to switch circuit 92, and electrically connects power supply line PL3 and grounding line SL3 to power output line DCL1 and power output line DCL2, respectively (step S120).

Next, voltage command generation portion 64A generates a voltage command value in accordance with an operating voltage level of load group 94, and then outputs the generated voltage command value to first inverter control portion 62 and second inverter control portion 63 (step S130). Thus, a voltage at the operating voltage level of load group 94 is generated across neutral points N1 and N2, so that electric power is supplied from neutral points N1 and N2 to load group 94 through switch circuit 92 and auxiliary battery B1 is charged.

On the other hand, if value SOC2 is not more than value SOC1 (NO in step S110), voltage command generation portion 64A outputs switch signal CH at L level to switch circuit 92, and then electrically connects power supply line PL4 and grounding line SL4 to power output line DCL1 and power output line DCL2, respectively (step S140).

Next, voltage command generation portion 64A generates a voltage command value in accordance with an operating voltage level of load group 96, and then outputs the generated voltage command value to first inverter control portion 62 and second inverter control portion 63 (step S150). Thus, a voltage at the operating voltage level of load group 96 is generated across neutral points N1 and N2, so that electric power is supplied from neutral points N1 and N2 to load group 96 through switch circuit 92 and auxiliary battery B2 is charged.

Herein, the load group which is not electrically connected to power output lines DCL1 and DCL2 receives electric power from the relevant auxiliary battery. If the SOC of the auxiliary battery is lowered, switch circuit 92 switches a connection state, so that the auxiliary battery having the lowered SOC is charged.

As described above, according to Embodiment 2, the voltage across neutral points N1 and N2 is controlled at the operating voltage level of load group 94 or 96, and electric power is supplied from neutral points N1 and N2 to load group 94 or 96 through switch circuit 92. Therefore, no DC/DC converter is required for generating a voltage to be supplied to load group 94 or 96.

Each of the foregoing embodiments describes the case where there are two load groups different in operating voltage level from each other. Even in a case where there are not less than three load groups different in operating voltage level from one another, likewise, a desired voltage can be generated and supplied to each load group without use of a DC/DC converter.

Moreover, each of the foregoing embodiments describes the case where one example of the electric powered vehicle is the hybrid vehicle that has engine 4 and motor generator MG2 each serving as a motive power source. Herein, an electric vehicle or a fuel cell vehicle equipped with at least two motor generators falls within a range to which the present invention is applicable. Further, the present invention is typically applicable to an electric powered vehicle equipped with at least two motor generators. If the electric powered vehicle according to the present invention is an electric vehicle or a fuel cell vehicle, motor generators MG1 and MG2 are linked to driving wheels of the electric vehicle or the fuel cell vehicle, for example.

In the foregoing description, motor generator MG1 and motor generator MG2 correspond to "a first polyphase AC motor" and "a second polyphase AC motor" according to the present invention, respectively, and three-phase coil 12 and three-phase coil 14 correspond to "a first polyphase winding" and "a second polyphase winding" according to the present invention, respectively. Moreover, power storage device B corresponds to "a first power storage device" according to the present invention, and inverters 20 and 30, motor generators MG1 and MG2, and control device 60 (60A) form "voltage control portion" according to the present invention. Further, each of auxiliary batteries B1 and B2 corresponds to "a second power storage device" according to the present invention, and switch circuit 92 corresponds to "a switch device" according to the present invention. Furthermore, wheel 2 corresponds to "a driving wheel" according to the present invention.

It should be understood that the embodiments disclosed herein are in all aspects illustrative and not restrictive. Since the scope of the present invention is defined by the appended claims rather than by the foregoing description, and all changes that fall within metes and bounds of the claims, or equivalence of such metes and bounds thereof are intended to be embraced by the claims.

The invention claimed is:

1. An electric power control device comprising:
a first polyphase AC motor including a star-connected first polyphase winding as a stator winding;
a second polyphase AC motor including a star-connected second polyphase winding as a stator winding;
a first power storage device supplying electric power to said first and second polyphase AC motors;
a vehicle-mounted load electrically connected between a first neutral point of said first polyphase winding and a second neutral point of said second polyphase winding;
a request voltage calculation portion calculating a request voltage for said vehicle-mounted load;
voltage control portion controlling a voltage across said first and second neutral points in accordance with the request voltage calculated by said request voltage calculation portion; and
a first inverter receiving a first signal from said voltage control portion and a second inverter receiving a second signal from said voltage control portion, said first inverter setting a potential of said first neutral point at a potential that is higher than a potential of said second neutral point set by said second inverter, wherein said request voltage for said vehicle-mounted load is controlled by said voltage control portion.

2. The electric power control device according to claim 1, wherein
said vehicle-mounted load includes a DC load having an operating voltage changed in accordance with an operating environment, and
said request voltage calculation portion calculates the request voltage for said DC load based on the operating environment of said DC load.

3. The electric power control device according to claim 2, wherein
said DC load includes a plurality of load groups different in operating voltage from each other,
said electric power control device further comprising:
a plurality of second power storage devices supplying electric power to said plurality of load groups, respectively; and
a switch device configured to be capable of electrically connecting one of said plurality of second power storage devices to said first and second neutral points,
said voltage control portion outputs, to said switch device, a command for electrically connecting one of said plurality of second power storage devices to said first and second neutral points, based on states-of-charge of said plurality of second power storage devices, and controls the voltage across said first and second neutral points at an operating voltage level of the load group that receives electric power from the second power storage device electrically connected to said first and second neutral points.

4. The electric power control device according to claim 3, wherein
said voltage control portion outputs, to said switch device, a command for electrically connecting the second power storage device having the lowest state-of-charge to said first and second neutral points.

5. An electric powered vehicle comprising:
the electric power control device according to claim 1; and
a driving wheel mechanically linked to a rotation shaft of at least one of said first and second polyphase AC motors.

6. A method for controlling electric power of an electric powered vehicle,
said electric powered vehicle including:
a first polyphase AC motor including a star-connected first polyphase winding as a stator winding;
a second polyphase AC motor including a star-connected second polyphase winding as a stator winding;
a first power storage device supplying electric power to said first and second polyphase AC motors;
a vehicle-mounted load electrically connected between a first neutral point of said first polyphase winding and a second neutral point of said second polyphase winding; and
a first inverter receiving a first signal from said voltage control portion and a second inverter receiving a second signal from said voltage control portion, said first inverter setting a potential of said first neutral point at a potential that is higher than a potential of said second neutral point set by said second inverter, wherein said request voltage for said vehicle- mounted load is controlled by said voltage control portion,
said method comprising:
a first step of calculating a request voltage for said vehicle-mounted load; and
a second step of controlling a voltage across said first and second neutral points in accordance with the calculated request voltage.

7. The method according to claim 6, wherein
said vehicle-mounted load includes a DC load having an operating voltage changed in accordance with an operating environment, and
said first step includes calculating the request voltage for said DC load based on the operating environment of said DC load.

8. The method according to claim 7, wherein
said DC load includes a plurality of load groups different in operating voltage from each other, and
said electric powered vehicle further includes:
a plurality of second power storage devices supplying electric power to said plurality of load groups, respectively; and
a switch device configured to be capable of electrically connecting one of said plurality of second power storage devices to said first and second neutral points,
said method further comprising
a third step of outputting, to said switch device, a command for electrically connecting one of said plurality of second power storage devices to said first and second neutral points based on states-of-charge of said plurality of second power storage devices,
said second step includes controlling the voltage across said first and second neutral points at an operating voltage level of the load group that receives electric power from the second power storage device electrically connected to said first and second neutral points.

9. The method according to claim 8, wherein
said third step includes outputting, to said switch device, a command for electrically connecting the second power storage device having the lowest state-of-charge to said first and second neutral points.

* * * * *